United States Patent
Yang

(10) Patent No.: US 10,902,408 B2
(45) Date of Patent: Jan. 26, 2021

(54) MOBILE PAYMENT METHOD USING A BARCODE, DEVICE AND SERVER FOR IMPLEMENTING THE METHOD

(71) Applicant: Chien-Kang Yang, Taipei (TW)

(72) Inventor: Chien-Kang Yang, Taipei (TW)

( * ) Notice: Subject to any disclaimer, the term of this patent is extended or adjusted under 35 U.S.C. 154(b) by 121 days.

(21) Appl. No.: 15/935,932

(22) Filed: Mar. 26, 2018

(65) Prior Publication Data

US 2018/0285857 A1  Oct. 4, 2018

(30) Foreign Application Priority Data

Mar. 29, 2017 (TW) .............................. 106110441 A

(51) Int. Cl.
*G06Q 20/32* (2012.01)
*G06Q 20/40* (2012.01)
(Continued)

(52) U.S. Cl.
CPC ....... *G06Q 20/3274* (2013.01); *G06K 7/1413* (2013.01); *G06Q 20/02* (2013.01);
(Continued)

(58) Field of Classification Search
CPC .... G06Q 20/40; G06Q 30/06; G06Q 20/3276; G06Q 20/20; G06Q 20/3274;
(Continued)

(56) References Cited

U.S. PATENT DOCUMENTS

2007/0112676 A1\* 5/2007 Kontio .................... H04L 63/12
                                                              705/50
2008/0313081 A1\* 12/2008 Wee ....................... G06Q 20/42
                                                              705/44
(Continued)

FOREIGN PATENT DOCUMENTS

CN          102842081 A       12/2012
CN          103957105 A        7/2014
(Continued)

OTHER PUBLICATIONS

An Office Action, which was issued to Japanese counterpart application No. 2018-063020 by the JPO dated May 14, 2019.
(Continued)

*Primary Examiner* — Alexander G Kalinowski
*Assistant Examiner* — Sanjeev Malhotra
(74) *Attorney, Agent, or Firm* — MLO, a professional corp.

(57) ABSTRACT

A mobile payment method is implemented using a buyer device, a seller device, and a server device. The method includes: displaying, by the buyer device, a barcode encoding verification information for verifying an identity of the user and payment information associated with a payment account; scanning, by the seller device, the barcode; generating, by the seller device, transfer information based on the barcode; in response to the determination that the transfer information is authentic, executing, by the server device, a payment procedure for processing a payment; and after the payment procedure is terminated, transmitting, by the server device, a payment result related to the payment to the buyer device and the seller device.

10 Claims, 4 Drawing Sheets

(51) Int. Cl.
*G06Q 20/02* (2012.01)
*G06Q 20/08* (2012.01)
*G06Q 20/10* (2012.01)
*G06K 7/14* (2006.01)

(52) U.S. Cl.
CPC ....... *G06Q 20/0855* (2013.01); *G06Q 20/102* (2013.01); *G06Q 20/322* (2013.01); *G06Q 20/3226* (2013.01); *G06Q 20/3276* (2013.01); *G06Q 20/3278* (2013.01); *G06Q 20/4014* (2013.01)

(58) Field of Classification Search
CPC .... G06Q 30/0601; G06Q 20/02; G06Q 20/10; G06Q 20/32; G06Q 20/322; G06Q 20/3278; G06Q 20/385; G06Q 2220/00; G06Q 20/12; G06Q 20/3821; G06Q 20/401; G06Q 20/4014; G06Q 40/00; G06Q 20/102; G06Q 20/327; G06Q 30/0613; G06Q 30/0641; G06Q 20/085; G06Q 20/0855; G06Q 20/105; G06Q 20/1085; G06Q 20/204; G06Q 20/223; G06Q 20/3221; G06Q 20/325; G06Q 20/36; G06Q 20/382; G06Q 20/3829; G06Q 20/387; G06Q 20/4012; G06Q 20/40145; G06Q 20/405; G06Q 20/425; G06Q 30/0226; G06Q 30/0267; G06Q 30/0609; G06K 19/06112; G06K 19/06028; G06K 7/1095; G06K 7/1413
USPC ........ 705/14.47, 14.51, 16, 17, 20, 21, 26.1, 705/27.1, 39, 43, 44, 50, 332; 235/375, 235/380
See application file for complete search history.

(56) References Cited

U.S. PATENT DOCUMENTS

| | | | | |
|---|---|---|---|---|
| 2009/0313138 | A1* | 12/2009 | Ratnakar | G01S 5/0018 705/26.1 |
| 2010/0049654 | A1* | 2/2010 | Pilo | G06Q 20/10 705/43 |
| 2010/0138344 | A1* | 6/2010 | Wong | G06Q 20/10 705/44 |
| 2012/0095855 | A1* | 4/2012 | Sterling | G06Q 30/0613 705/16 |
| 2012/0116922 | A1* | 5/2012 | Ku | G06Q 30/0641 705/27.1 |
| 2012/0271712 | A1* | 10/2012 | Katzin | G07G 3/003 705/14.51 |
| 2012/0284130 | A1* | 11/2012 | Lewis | G06Q 40/00 705/16 |
| 2013/0091059 | A1* | 4/2013 | Stals | G06Q 20/20 705/44 |
| 2013/0110721 | A1* | 5/2013 | Bogaard | G06Q 20/02 705/44 |
| 2013/0126607 | A1* | 5/2013 | Behjat | G06Q 20/326 235/380 |
| 2013/0240622 | A1 | 9/2013 | Zhou et al. | |
| 2014/0019360 | A1* | 1/2014 | Yang | G06Q 20/4012 705/44 |
| 2014/0081783 | A1* | 3/2014 | Paranjape | G06Q 20/40 705/21 |
| 2014/0089117 | A1* | 3/2014 | Schumacher | G06Q 20/40 705/21 |
| 2014/0095384 | A1* | 4/2014 | Basha | G06Q 20/385 705/44 |
| 2014/0117074 | A1* | 5/2014 | Kim | G06K 7/10722 235/375 |
| 2014/0149291 | A1* | 5/2014 | Bercaw | G06Q 30/0601 705/44 |
| 2014/0164229 | A1* | 6/2014 | Jones | G06Q 20/105 705/39 |
| 2014/0263652 | A1 | 9/2014 | Auger | |
| 2014/0310174 | A1* | 10/2014 | Heeter | G06Q 20/3276 705/44 |
| 2014/0330656 | A1* | 11/2014 | Zhou | G06Q 20/401 705/16 |
| 2014/0351071 | A1* | 11/2014 | Hong | G06Q 20/208 705/20 |
| 2015/0206128 | A1* | 7/2015 | Torossian | G06Q 20/327 705/21 |
| 2015/0213436 | A1* | 7/2015 | Griffin | G06Q 20/322 705/44 |
| 2015/0248665 | A1* | 9/2015 | Walz | G06Q 20/3274 705/14.27 |
| 2015/0294293 | A1* | 10/2015 | Signarsson | G06Q 20/327 705/17 |
| 2015/0348013 | A1* | 12/2015 | Gulchenko | G06Q 20/386 705/17 |
| 2016/0027042 | A1* | 1/2016 | Heeter | G06Q 30/0248 705/14.47 |
| 2016/0057619 | A1 | 2/2016 | Lopez | |
| 2016/0098721 | A1* | 4/2016 | Bogaard | G06Q 20/0855 705/44 |
| 2016/0110683 | A1* | 4/2016 | Gupta | G06Q 10/0832 705/332 |
| 2016/0286128 | A1* | 9/2016 | Zhou | B64C 39/024 |
| 2016/0328701 | A1* | 11/2016 | Lee | G06Q 20/3276 |
| 2017/0161696 | A1* | 6/2017 | Hattar | G06Q 20/042 |
| 2017/0161717 | A1* | 6/2017 | Xing | G06K 19/06112 |
| 2017/0161730 | A1* | 6/2017 | Hattar | G06Q 20/14 |
| 2017/0323285 | A1* | 11/2017 | Xing | G06F 3/015 |

FOREIGN PATENT DOCUMENTS

| | | |
|---|---|---|
| CN | 105654288 A | 6/2016 |
| CN | 105893812 A | 8/2016 |
| JP | 2001344545 A | 12/2001 |
| JP | 201475038 A | 4/2014 |
| TW | M507553 U | 8/2015 |

OTHER PUBLICATIONS

Search Report appended to an Office Action issued to Taiwanese counterpart application No. 106110441 by the TIPO dated Sep. 11, 2018.

The Search Report issued to European counterpart application No. 18164435.2 by the EPO dated Jun. 28, 2018.

Search Report appended to an Office Action, which was issued to Taiwanese counterpart application No. 108100753 by the TIPO dated Jan. 13, 2020, with an English translation thereof.

* cited by examiner

MOBILE PAYMENT METHOD USING A BARCODE, DEVICE AND SERVER FOR IMPLEMENTING THE METHOD

CROSS-REFERENCE TO RELATED APPLICATION

This application claims priority of Taiwanese Patent Application No. 106110441, filed on Mar. 29, 2017.

FIELD

The disclosure relates to a method for cashless transaction, and more particularly to a mobile payment method using a barcode.

BACKGROUND

Conventional "plastic money" refers to plastic cards such a bank card (e.g., a credit card, a debit card, a smart card, etc.) that are used in transactions in place of cash. The transactions done with the plastic money may be processed more efficiently and conveniently than transactions by cash.

In order to verify the authenticity of a plastic card, a seller who accepts the plastic card transmits the transaction record involving the plastic card to the financial institution that issues the plastic card to the card holder. It is noted that a user typically owns a number of cards that may be now digitized and integrated into an electronic device, and payments may be processed as mobile payments. Verification of the user during the mobile payments may be a desirable effect.

SUMMARY

It is one object of the disclosure to provide a mobile payment method that enables mobile payments of cashless transactions to be done with real-time verification.

According to one embodiment of the disclosure, the mobile payment method is implemented using a buyer device held by a user, a seller device held by a seller, and a server device that communicates with the buyer device and the seller device and that is held by a payment institution. The mobile payment method includes steps of:

in response to detection of a user operation indicating a request to display a barcode, displaying, by the buyer device, a barcode on a display thereof, the barcode encoding verification information for verifying an identity of the user, and payment information associated with a payment account, wherein data to be encoded in the barcode is separated into at least two data files and stored in the portable electronic device (1), and before displaying the barcode, the portable electronic device (1) combines the at least two data files to obtain the barcode;

scanning, by the seller device, the barcode displayed on the buyer device;

generating, by the seller device, transfer information based on the barcode and seller information associated with a payee account;

transmitting, by the seller device, the transfer information to the server device;

determining, by the server device, whether the transfer information received from the seller device is authentic;

in response to the determination that the transfer information is authentic, executing, by the server device, a payment procedure for processing a payment for a transaction between the user and the seller according to the transfer information; and after the payment procedure ends, transmitting, by the server device, a payment result related to the payment to the buyer device and the seller device.

Another object of the disclosure is to provide an electronic device that is capable implementing the above-mentioned method.

According to one embodiment of the disclosure, the electronic device includes a communication unit that is capable of communicating with a server device via a network, a display for displaying a barcode, an input interface allowing a user to input a password, a barcode generating module coupled to the input interface for receiving the password inputted by the user therefrom, and a processor.

The barcode generating module is programmed to verify the password in response to receipt of the password, and, when the password is successfully verified, generate a barcode that encodes verification information for verifying an identity of the user, and payment information associated with a payment account, wherein data to be encoded in the barcode is separated into at least two data files and stored in the electronic device, and before displaying the barcode, the electronic device combines the at least two data files to obtain the barcode.

The processor is electrically connected to the display, is operatively associated with the barcode generating module for receiving the barcode therefrom, and is programmed to control the display to display the barcode for scanning by a seller device, so as to enable the seller device and the server device to execute a payment procedure for processing a payment for a transaction between the user and a seller who holds the seller device, according at least to the payment information encoded in the barcode when the verification information is successfully verified by the server device.

The processor is further programmed to receive a payment result related to the payment from the server device through the communication unit, and to control the display to display the payment result.

Yet another object of the disclosure is to provide a server device that is capable implementing the above-mentioned method.

According to one embodiment of the disclosure, the server device includes a commercial platform for communicating with a buyer device held by a user and a seller device held by a seller, and a payment server communicating with the commercial platform.

The commercial platform is programmed to:
generate barcode data for displaying a barcode, the barcode encoding verification information for verifying an identity of the user, and payment information associated with a payment account, wherein data to be encoded in the barcode is separated into at least two data files and stored in the buyer device, and before displaying the barcode, the buyer device combines the at least two data files to obtain the barcode;
transmit the barcode data to the buyer device so as to enable the buyer device to display the barcode;
receive, from the seller device, transfer information that includes the barcode and seller information associated with a payee account;
obtain the verification information from the barcode;
verify the verification information; and
transmit the transfer information to the payment server.

The payment server is programmed to, in response to receipt of the transfer information, execute a payment procedure for processing a payment for a transaction between the user and the seller according to the transfer information, and transmit a payment result related to the payment to the buyer device and the seller device through the commercial platform.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
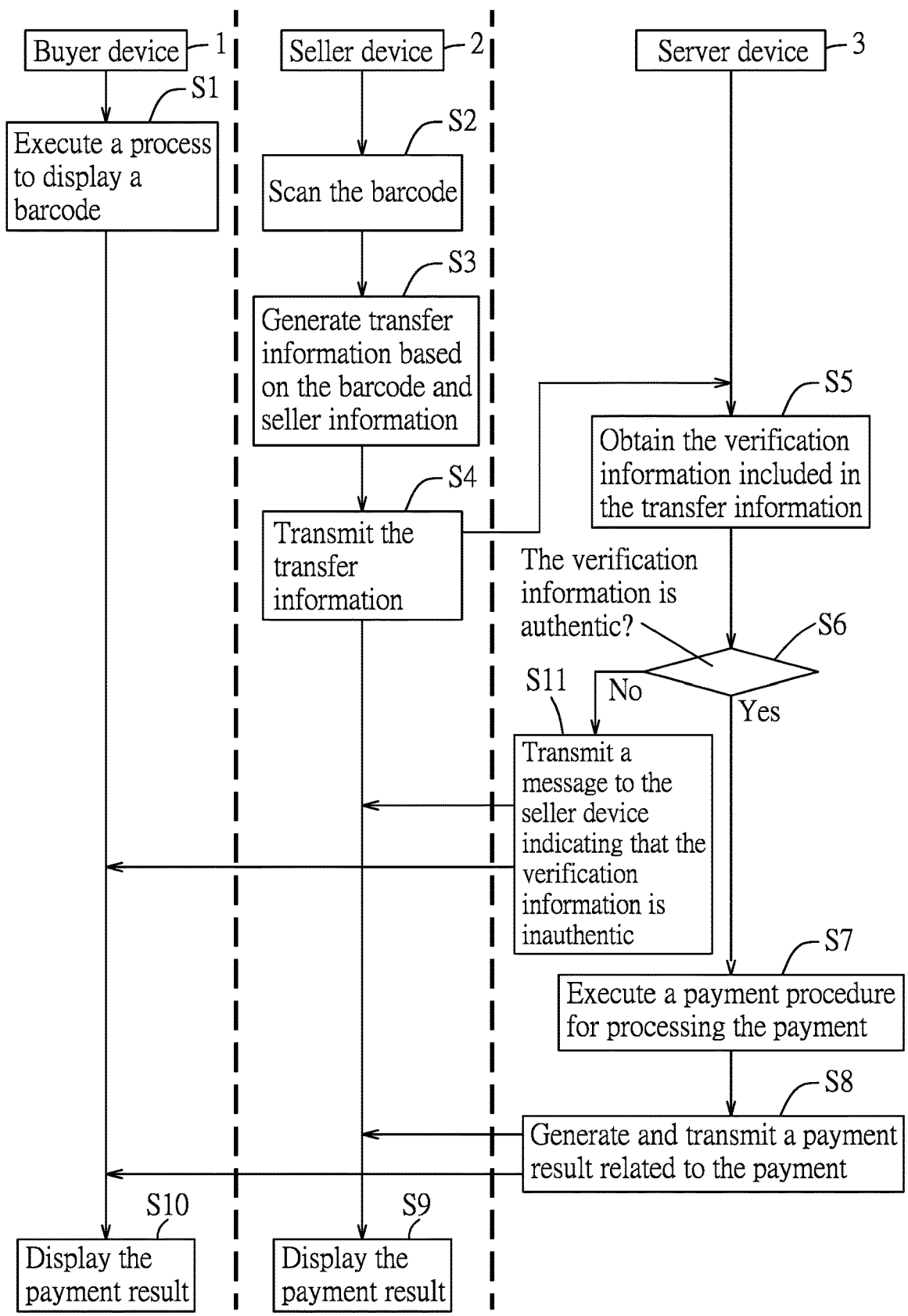
FIG. 1 is a flow chart illustrating steps of a mobile payment method according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a flow chart illustrating steps of a mobile payment method according to one embodiment of the disclosure.

The mobile payment method may be implemented using a buyer device 1 held by a user, a seller device 2 held by a seller, and a server device 3 that communicates with the buyer device 1 and the seller device 2 and that is held by a payment institution. The seller, for example, may be a merchant or a service provider.

Figure 2:
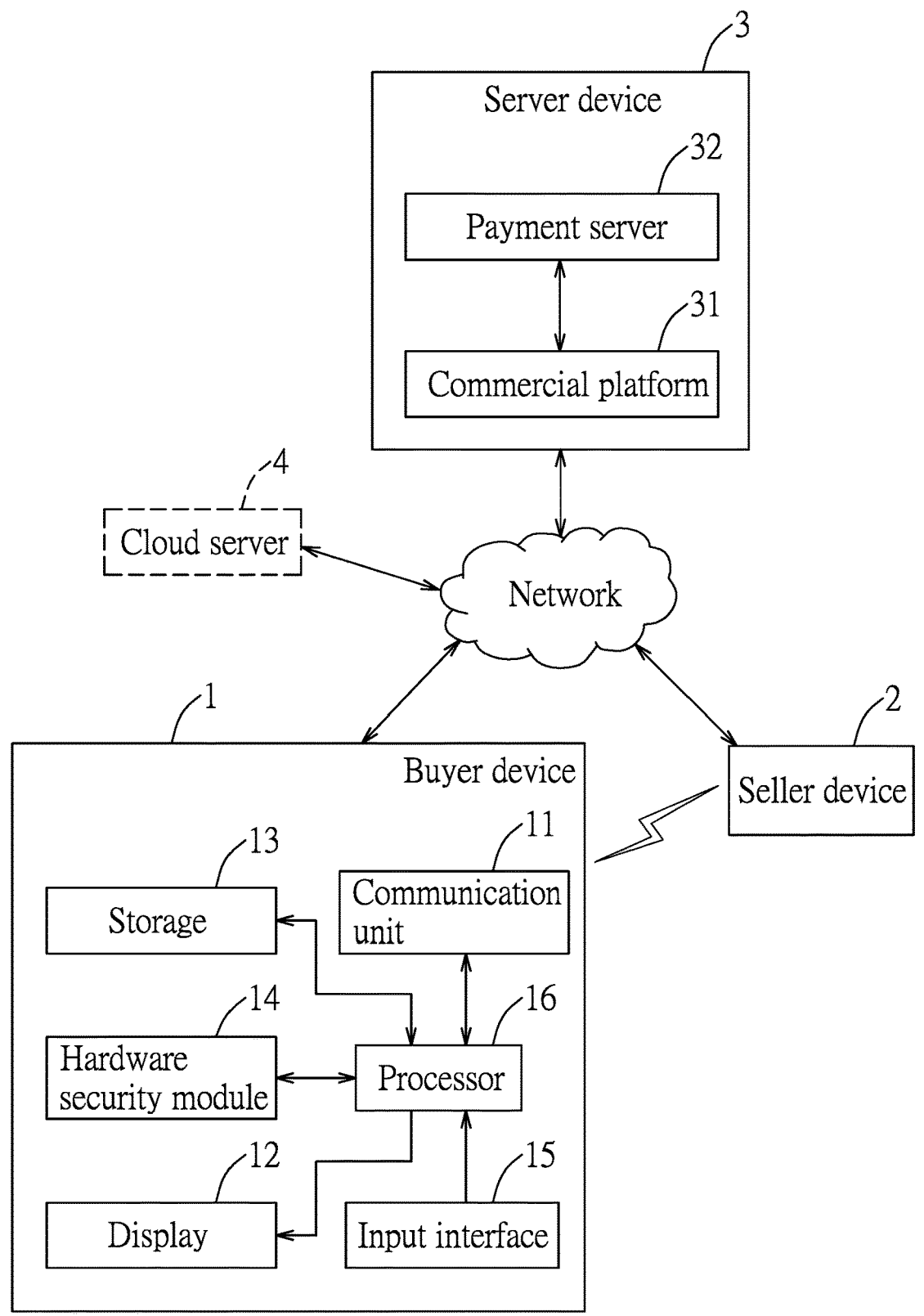
FIG. 2 is a block diagram illustrating a buyer device, a seller device, and a server device according to one embodiment of the disclosure.

FIG. 2 is a block diagram illustrating the buyer device 1, the seller device 2 and the server device 3 according to one embodiment of the disclosure. In this embodiment, the buyer device 1 may be embodied using an electronic device such as a cell phone, a tablet, or other mobile devices with wireless connectivity. The buyer device 1 includes a processor 16, a communication unit 11, a display 12, a storage 13, and an input interface 15. In this embodiment, a hardware security module 14 is installed on and accessible by the buyer device 1. The hardware security module 14 is implemented by hardware, may be embodied using one of a stand-alone, external portable device removably connected to the buyer device 1 (e.g., a smart card) and a physical built-in module embedded in the buyer device 1. An exemplary smart card may be embodied using one as disclosed in Taiwanese Patent No. 1537851.

In general, the hardware security module 14 includes a processing component for performing computations, and a physical storage for storing data therein.

Figure 3:
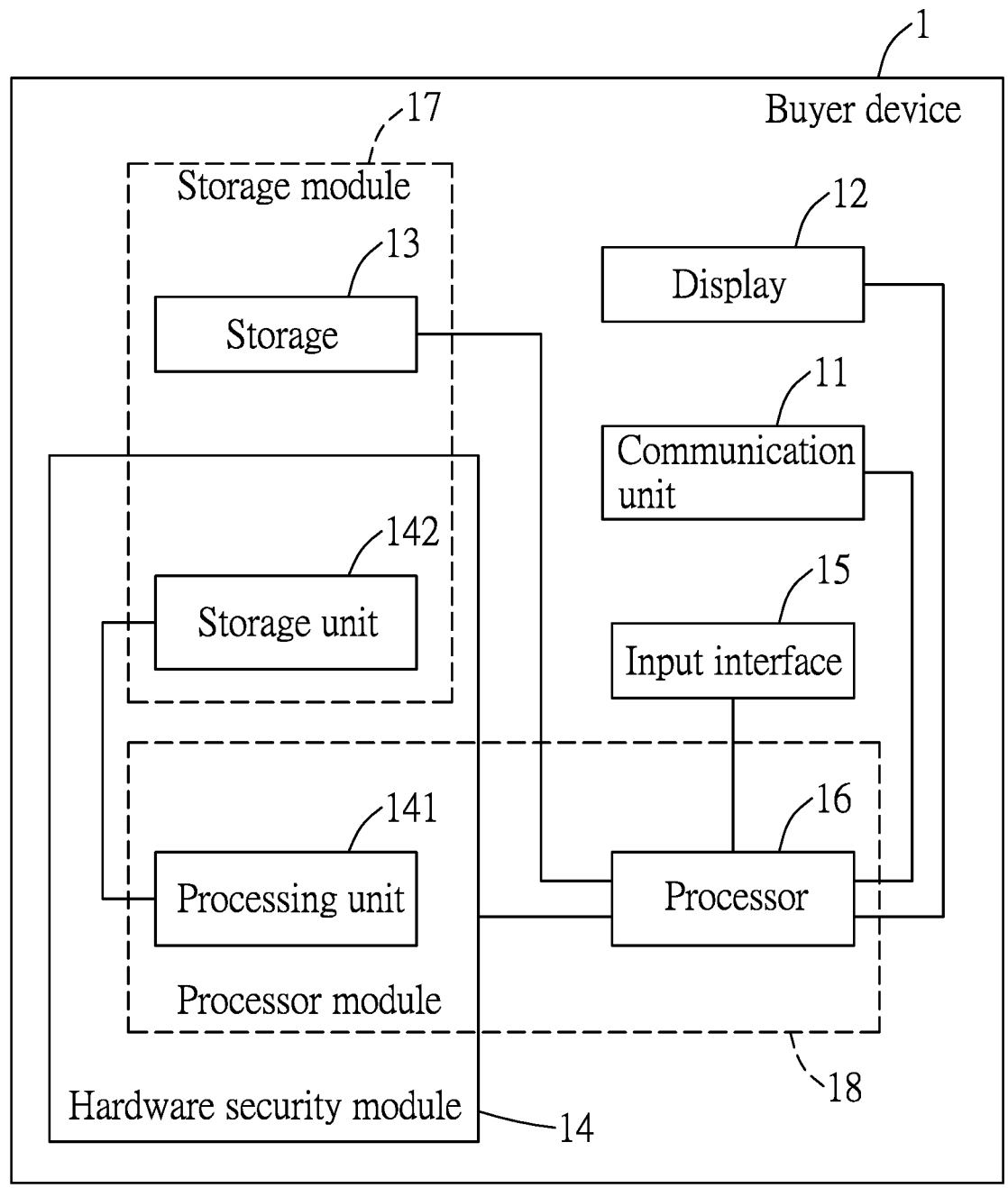
FIG. 3 is a block diagram illustrating the buyer device 1 connected to the hardware security module 14, which is a smart card, according to one embodiment of the disclosure.
Figure 4:
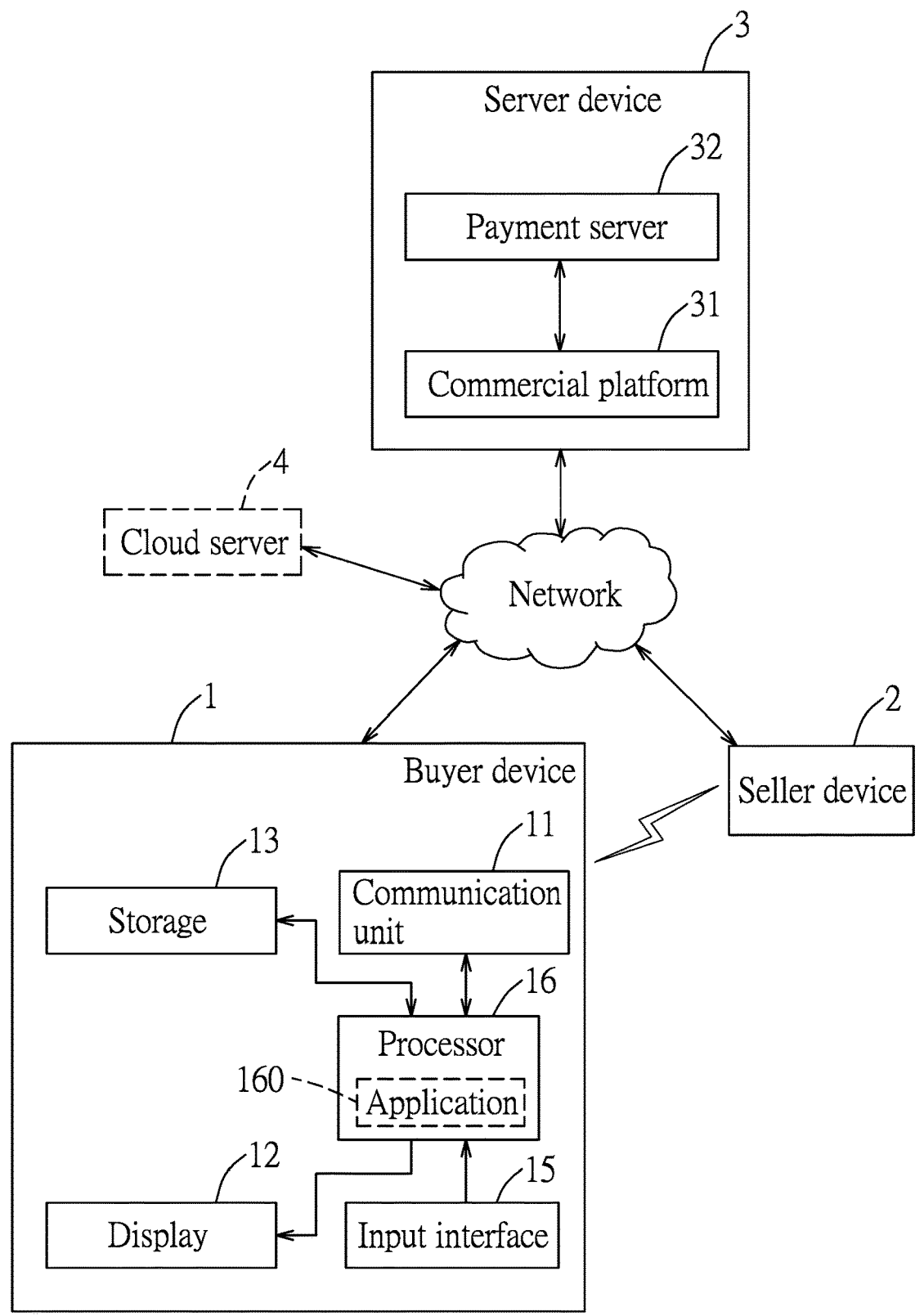
FIG. 4 is a block diagram illustrating a buyer device, a seller device, and a server device according to one embodiment of the disclosure.

FIG. 3 is a block diagram illustrating the buyer device 1 connected to the hardware security module 14, which is a smart card, according to one embodiment of the disclosure. In this embodiment, the hardware security module 14 includes a processing unit 141 and a storage unit 142. In this way, the buyer device 1 may be said to include a storage module 17 that includes the storage 13 and the storage unit 142. Moreover, the buyer device 1 may be said to include a processor module that includes the processor 16 and the processing unit 141. It is noted that some embodiments may omit the hardware security module 14 (e.g., when one is not available), and the functionalities of the hardware security module 14 may be performed by the buyer device 1 executing a software application 160, as seen in FIG. 4.

The communication unit 11 may be a component that supports wireless communication such as cellular connection, Wi-Fi, Bluetooth®, etc. The display 12 may be embodied using a display screen. The storage 13 may be embodied using a physical memory device such as a non-volatile random access memory (RAM), e.g., a flash memory. The input interface 15 may be incorporated with the display screen as a touch screen.

The seller device 2 may be embodied using an electronic device such as a personal computer, a notebook, a laptop, a tablet, a mobile device, and includes an image capturing component (not shown) (such as a camera, a barcode reader, etc.).

The server device 3 is capable of communicating with the buyer device 1 and the seller device 2 via a network (e.g., the Internet), and includes a commercial platform 31, and a payment server 32 for executing a payment procedure.

In use, when the user of the buyer device 1 decides to conduct a transaction with the seller using the mobile payment method, the user may operate the input interface 15 of the buyer device 1 to input a request for displaying a barcode. This may be done by the user operating the input interface 15 to generate a command for causing the processor 16 to execute the application 160. In response to the user operation, in step S1, the processor 16 executes the application 160 so as to execute a procedure to display a barcode on the display 12.

In this embodiment, the barcode may be in a form of a one-dimensional barcode (linear barcode), a two-dimensional barcode such as a quick response (QR) code, a three-dimensional barcode, etc., and encodes verification information for verifying an identity of the user, and payment information associated with a payment account (i.e., an account that pays money in return for service/merchandise). In this embodiment, the verification information may further include a payment amount of a payment for a transaction between the user and the seller, an account number of the payment account, a certification code, etc.

In some embodiments, the processor 16 may require the user to input a password using the input interface 15, and execute the procedure only when determining that the password inputted by the user is correct.

In some embodiments, the barcode may be a static barcode that encodes data provided by the commercial platform 31 of the server device 3. For example, the data to be encoded in the static barcode may be stored in advance in the hardware security module 14 which is accessible by the buyer device 1. As such, the processor 16 may require the user to input a password using the input interface 15, and transmit the password to the hardware security module 14, which verifies the password and allows the processor 16 to obtain the data stored therein for subsequent display only when the password is successfully verified (i.e., the password is correct). This configuration may be employed in small amount transactions.

Afterward, in step S2, the seller may operate the image capturing component of the seller device 2 to scan the barcode displayed on the display 12.

In step S3, the seller device 2 generates transfer information based on the barcode (which is encoded with the verification information) and seller information that is associated with a payee account held by the seller, so that the transfer information includes at least the verification information and the seller information. In this embodiment, the seller information includes at least an account number of the payee account (i.e., an account that is to receive the payment from the user). In cases that the payment amount of the payment is already known to the server device 3 (e.g., the service/merchandise is to be paid at a fixed rate for all transactions), the seller information does not need to include additional information. On the other hand, when the payment amount is variable among different transactions, other information, such as the payment amount, may be incorporated into the seller information. In addition, details of the transaction, including but not limited to, the service/merchandise provided by the seller, a number of articles sold in the transaction, a serial number representing the seller, information regarding the seller device 2 (e.g., an Internet protocol (IP) address, an equipment identity number of the seller device 2) may be selectively incorporated into the seller information as well.

In step S4, the seller device 2 transmits the transfer information to the server device 3.

In response to receipt of the transfer information, the server device 3 obtains the verification information included in the transfer information in step S5, and determines whether the verification information is authentic in step S6.

When it is determined by the server device 3 that the verification information is authentic, the flow proceeds to step S7, in which the server device 3 executes a payment procedure for processing the payment for the transaction between the user and the seller according to the transfer information.

Otherwise, the flow proceeds to step S11, in which the server device 3 transmits a message to the seller device 2 indicating that the verification information is inauthentic, and the payment procedure cannot be executed, and the method is therefore terminated.

In step S8, after the payment procedure ends, the server device 3 generates a payment result related to the payment, and transmits the payment result to the buyer device 1 and the seller device 2. In response, both of the seller device 2 and the buyer device 1 are able to display the payment result in steps S9 and S10, respectively.

For example, when the payment procedure is successfully completed (i.e., the payment amount of the payment is successfully transferred from the payment account to the payee account), the payment result may include a message indicating that the payment is completed. On the other hand, when the payment procedure cannot be completed due to various reasons such as insufficient fund in the payment account, a credit card being expired, etc., the payment result may include a message indicating that the payment is not completed. In some embodiments, when the payment procedure cannot be completed, the flow may return to step S1 for the buyer device 1 to display the barcode again.

It is noted that in various embodiments, the barcode may be generated in various ways before being displayed, and may include various information based on different conditions regarding the mobile payment method.

According to one exemplary embodiment, the barcode is a static barcode encoding the data provided by the commercial platform 31. Before implementing step S1, the data to be encoded in the barcode is divided into a first part that is stored in the commercial platform 31 or a cloud server 4, and a second part that is stored in the hardware security module 14. As such, in step S1, the buyer device 1 communicates with the commercial platform 31 or the cloud server 4 to obtain the first part of the data, accesses the hardware security module 14 to obtain the second part of the data, combines the first part and the second part to obtain the data to be encoded in the barcode, and generates and displays the barcode based on the data.

According to one exemplary embodiment, the barcode is a static barcode encoding the data provided by the commercial platform 31. Before implementing step S1, the buyer device 1 may communicate with the commercial platform 31 to obtain the data to be encoded in the barcode, divide the data obtained from the commercial platform 31 into a plurality of divided files, and store the divided files in the hardware security module 14. As such, step S1 may include the following sub-steps of the buyer device 1 accessing the hardware security module 14 to obtain the divided files, combining the divided files to obtain the data, and generating the barcode based on the data.

According to one exemplary embodiment, the barcode is a static barcode encoding the data provided by the commercial platform 31. Before implementing step S1, the buyer device 1 may communicate with the commercial platform 31 to obtain the data to be encoded in the barcode, divide the data obtained from the commercial platform 31 into at least a first divided file and a second divided file, encrypt at least the first divided file into an encrypted file, and store the encrypted file and the second divided file in the storage 13. As such, step S1 may include the sub-steps of the buyer device 1 accessing the storage 13 to obtain the encrypted file and the second divided file, and displaying an instruction to require the user to input a password. Further in step S1, when it is determined that a password inputted by the user is correct, the buyer device 1 decrypts the encrypted file to obtain the first divided file, combines the first and second divided files to obtain the data, and generates and displays the barcode based on the data. It is noted that this embodiment may be employed when the hardware security module 14 is not available, and the functionalities of the hardware security module 14 may be performed by the buyer device 1 executing the application 160.

According to one exemplary embodiment, one or more payment manners may be associated with the application 160, and will be available for the user. In the case that the application 160 is only associated with one payment manner (e.g., one credit card), the payment information may be pre-stored in the hardware security module 14. In the case that the application 160 is associated with a plurality of different payment manners (e.g., multiple credit cards, cash transfer, etc.), the payment information may be generated by the buyer device 1 based on a selected one of the payment manners selected by the user, and stored in the hardware security module 14 prior to displaying the barcode.

After the payment information is available, the buyer device 1 displays an instruction to require the user to input a password. In response to receipt of a password inputted by the user, the buyer device 1 requires the hardware security module 14 to verify the password. When the password is successfully verified by the hardware security module 14, the buyer device 1 transmits a request for an authorization parameter to the server device 3. In response to receipt of the authorization parameter from the server device 3 through the buyer device 1, the hardware security module 14 creates a message authentication code (MAC) for the authorization parameter as the verification information using a preset key, and dynamically generates barcode data based on the verification information, the payment information and the authorization parameter, and transmits the barcode data to the buyer device 1 to enable the buyer device 1 to display the barcode based on the barcode data.

In this embodiment, the commercial platform 31 stores the preset key and the authorization parameter, and the payment server 32 is for executing the payment procedure. Prior to step S1, the method further includes a step of transmitting, by the hardware security module 14 through the buyer device 1, a request for the authorization parameter to the commercial platform 31. In step S3, the transfer information generated by the seller device 2 further includes the authorization parameter.

Step S6 includes the following sub-steps. Firstly, the commercial platform 31 compares the authorization parameter included in the transfer information with the authorization parameter stored in the commercial platform 31. Then, in response to the determination that the authorization parameter included in the transfer information and the authorization parameter stored in the commercial platform 31 are identical, the commercial platform 31 uses the preset key stored in the commercial platform 31 to create a MAC for the authorization parameter stored in the commercial platform 31, and compares the MAC thus generated with the verification information (i.e., the MAC).

When the MAC thus generated and the verification information are identical to each other, the commercial platform 31 determines that the verification information included in the transfer information is authentic.

In an alternative implementation, Step S6 includes the following sub-steps. Firstly, the payment server 32, instead of the commercial platform 31, compares the authorization parameter included in the transfer information with the authorization parameter stored in the commercial platform 31. In response to the determination that the authorization parameter included in the transfer information and the authorization parameter stored in the commercial platform 31 are identical, the payment server 32 uses the preset key stored in the commercial platform 31 to create a MAC for the authorization parameter stored in the commercial platform 31, and compares the MAC thus generated with the verification information. When the MAC thus generated and the verification information are identical, the payment server 32 determines that the transfer information is authentic.

According to one exemplary embodiment, the payment information may be pre-stored in the hardware security module 14, or be generated by the buyer device 1 based on a payment manner selected by the user and then stored in the hardware security module 14 prior to displaying the barcode as described above.

Afterward, step S1 may include the following sub-steps. Firstly, the buyer device 1 displays an instruction to require the user to input a password, and in response to receipt of a password inputted by the user, requires the hardware security module 14 to verify the password. Afterward, the buyer device 1 transmits a request for an authorization parameter to the server device 3 when the password is successfully verified by the hardware security module 14. Upon receipt of the authorization parameter from the server device 3 through the buyer device 1, the hardware security module 14 creates a message authentication code (MAC) as the verification information using a preset key. In this embodiment, the MAC is created for the authorization parameter and a payment amount of the payment. Then, the hardware security module 14 dynamically generates barcode data based on the verification information (including the amount of the payment), the payment information and the authorization parameter, and transmits the barcode data to the buyer device 1 to enable the buyer device 1 to display the barcode based on the barcode data.

In this embodiment, the commercial platform 31 stores the preset key, the authorization parameter and the payment amount, and the payment server 32 is for executing the payment procedure. Prior to the sub-step of dynamically generating barcode data, the mobile payment method includes a step of transmitting, by the hardware security module 14 through the buyer device 1, the payment amount and a request for the authorization parameter to the commercial platform 31.

It is noted that, the payment amount may be inputted by the user of the buyer device 1, or transmitted from the seller device 2 via, for example, a near field communication (NFC) connection for the user to review. When the user confirms the payment amount, the payment amount may then be transmitted to the commercial platform 31.

In step S3, the transfer information generated by the seller device 2 further includes the authorization parameter.

Step S6 includes the following sub-steps. Firstly, the commercial platform 31 compares the authorization parameter included in the transfer information with the authorization parameter stored in the commercial platform 31. Then, in response to the determination that the authorization parameter included in the transfer information and the authorization parameter stored in the commercial platform 31 are identical, the commercial platform 31 uses the preset key stored in the commercial platform 31 to create a MAC for the authorization parameter stored in the commercial platform 31, and compares the MAC thus generated with the verification information.

When the MAC thus generated and the verification information are identical to each other, the commercial platform 31 determines that the verification information included in the transfer information is authentic.

In an alternative implementation, the commercial platform 31 stores the preset key, the authorization parameter and the payment amount. Prior to the step of dynamically generating barcode data, the mobile payment method includes a step of transmitting, by the hardware security module 14 through the buyer device 1, the payment amount and a request for the authorization parameter to the commercial platform 31. In step S3, the transfer information generated by the seller device 2 further includes the authorization parameter and the payment amount.

Step S6 includes the following sub-steps. Firstly, the payment server 32 compares the authorization parameter and the payment amount included in the transfer information with the authorization parameter and the payment amount stored in the commercial platform 31, respectively. When it is determined that the authorization parameter and the payment amount included in the transfer information and the authorization parameter and the payment amount stored in the commercial platform 31 are identical, respectively, the payment server 32 uses the preset key stored in the commercial platform 31 to create a MAC for the authorization parameter and the payment amount stored in the commercial platform 31, and compares the MAC thus generated with the verification information. When the MAC thus generated and the verification information are identical, the payment server 32 determines that the verification information included in the transfer information is authentic. It is noted that in this implementation, verification is performed on both the payment amount and the verification information.

According to one exemplary embodiment, the payment information may be pre-stored in the hardware security module 14, or be generated by the buyer device 1 based on a payment manner selected by the user, and then stored in the hardware security module 14 prior to displaying the barcode as described above.

As such, step S1 may include the following sub-steps. First, the buyer device 1 displays an instruction to require the user to input a password. In response to receipt of a password inputted by the user, the buyer device 1 requires the hardware security module 14 to verify the password. When the password is successfully verified by the hardware security module 14, the hardware security module 14 dynamically generates barcode data based on the verification information and the payment information. Then, the hardware security module 14 transmits the barcode data to the buyer device 1. Then, the buyer device 1 displays the barcode based on the barcode data. It is noted that in this embodiment, the hardware security module 14 is not required to obtain the authentication parameter from the server device 3.

In this embodiment, step S5 includes the commercial platform 31 receiving the transfer information and obtaining the verification information included in the transfer information. Step S6 includes verifying whether the verification information is correct by the commercial platform 31, and the payment procedure is executed by the payment server 32. In an alternative implementation, step S5 includes the commercial platform 31 receiving the transfer information, obtaining the verification information included in the transfer information, and transmitting the verification information to the payment server 32. In turn, step S6 includes verifying whether the verification information is correct by the payment server 32.

According to one exemplary embodiment, the payment information may be pre-stored in the hardware security module 14, or be generated by the buyer device 1 based on a payment manner selected by the user and then stored in the hardware security module 14 prior to displaying the barcode as described above.

As such, step S1 may include the following sub-steps. First, the buyer device 1 displays an instruction to require the user to input a password. In response to receipt of a password inputted by the user, the buyer device 1 requires the hardware security module 14 to verify the password. When the password is successfully verified by the hardware security module 14, the buyer device 1 transmits a payment amount of the payment to the server device 3, and the hardware security module 14 dynamically generates barcode data based on the verification information and the payment information, and the payment amount. Then, the hardware security module 14 transmits the barcode data to the buyer device 1. Next, the buyer device 1 displays the barcode based on the barcode data.

In this embodiment, step S5 includes the commercial platform 31 receiving the transfer information and obtaining the verification information included in the transfer information. Step S6 includes verifying whether the verification information and the payment amount are correct by the commercial platform 31, and the payment procedure is executed by the payment server 32 when the verification information and the payment amount are verified to be correct. In an alternative implementation, step S5 includes the commercial platform 31 receiving the transfer information, obtaining the verification information included in the transfer information, and transmitting the verification information to the payment server 32. In turn, step S6 includes verifying whether the verification information and the payment amount are correct by the payment server 32.

According to one exemplary embodiment, the verification information and the payment information are pre-stored in the server device 3. As such, step S1 includes the following sub-steps. The buyer device 1 first transmits, to the server device 3, a request for barcode data for displaying the barcode. In response to the request, the server device 3 dynamically generates the barcode data based on the verification information and the payment information stored therein. Afterward, the server device 3 transmits the barcode data to the buyer device 1. Next, the buyer device 1 displays the barcode based on the barcode data. For example, the commercial platform 31 stores the verification information and the payment information therein, and dynamically generates the barcode data based on the verification information and the payment information for the displaying of the barcode in step S1.

In this embodiment, step S5 includes the commercial platform 31 receiving the transfer information and obtaining the verification information included in the transfer information. Step S6 includes the commercial platform 31 verifying whether the verification information included in the transfer information is correct (e.g., by comparing the verification information obtained in step S5 with that stored in the commercial platform 31), and the payment procedure is executed by the payment server 32.

In an alternative implementation, the payment server 32 stores the verification information and the payment information therein, and dynamically generates the barcode data based on the verification information and the payment information for the displaying of the barcode in step S1. Step S5 includes the commercial platform 31 receiving the transfer information, obtaining the verification information included in the transfer information, and transmitting the verification information to the payment server 32. Step S6 includes the payment server 32 verifying whether the verification information included in the transfer information is correct, and the payment procedure is executed by the payment server 32.

According to one exemplary embodiment, the verification information is pre-stored in the server device 3. In step S1, the buyer device 1 first transmits a request for barcode data to the server device 3, and the request is associated with a payment manner selected by the user. In response to the request, the server device 3 generates the payment information based on the payment manner. Afterward, the server device 3 dynamically generates the barcode data based on the verification information pre-stored therein and the payment information thus generated, and transmits the barcode data to the buyer device 1. Next, the buyer device 1 displays the barcode based on the barcode data. For example, the verification information is pre-stored in the commercial platform 31, the payment information is generated by the commercial platform 31 based on the payment manner, and the barcode data is dynamically generated by the commercial platform 31 based on the verification information and the payment information for the displaying of the barcode in step S1.

In this embodiment, step S5 includes the commercial platform 31 receiving the transfer information and obtaining the verification information included in the transfer information. Step S6 includes the commercial platform 31 verifying whether the verification information included in the transfer information is correct, and the payment procedure is executed by the payment server 32.

In an alternative implementation, the verification information is stored in the payment server 32, the payment information is generated by the commercial platform 31 based on the payment manner, and the barcode data is dynamically generated by the commercial platform 31 based on the verification information and the payment information for the displaying of the barcode in step S1. Step S5 includes the commercial platform 31 receiving the transfer information, obtaining the verification information included in the transfer information, and transmitting the verification information to the payment server 32. Step S6 includes the payment server 32 verifying whether the verification information included in the transfer information is correct, and the payment procedure is executed by the payment server 32.

According to one exemplary embodiment, the verification information and the payment information are pre-stored in the server device 3.

As such, step S1 includes the following sub-steps. First, the buyer device 1 first transmits a request for barcode data for displaying the barcode to the server device 3. The request may be associated with a payment amount of the payment. Specifically, the request may include the amount of the payment. In response to the request, the server device 3 dynamically generates the barcode data based on the verification information, the payment information and the payment amount. Afterward, the server device 3 transmits the barcode data to the buyer device 1. Next, the buyer device 1 displays the barcode based on the barcode data. For example, the verification information and the payment information are stored in the commercial platform 31. The barcode data is dynamically generated by the commercial platform 31 based on the verification information and the payment information.

In this embodiment, step S5 includes the commercial platform 31 receiving the transfer information and obtaining the verification information included in the transfer information. Step S6 includes the commercial platform 31 verifying whether the verification information included in the transfer information is correct, and the payment procedure is executed by the payment server 32.

In an alternative implementation, the verification information and the payment information are pre-stored in the payment server 32. The barcode data is dynamically generated by the payment server 32 based on the verification information, the payment information and the payment amount.

In this embodiment, step S5 includes the commercial platform 31 receiving the transfer information, obtaining the verification information included in the transfer information, and transmitting the verification information to the payment server 32. Step S6 includes the payment server 32 verifying whether the verification information included in the transfer information is correct, and the payment procedure is executed by the payment server 32.

According to one exemplary embodiment, the verification information and the payment amount are pre-stored in the server device 3. In step S1, the buyer device 1 first transmits a request for barcode data for displaying the barcode to the server device 3, and the request includes a payment manner selected by the user. In response to the request, the server device 3 generates the payment information based on the payment manner, and dynamically generates the barcode data based on the verification information, the payment information and the payment amount. Afterward, the server device 3 transmits the barcode data to the buyer device 1, and the buyer device 1 displays the barcode based on the barcode data. For example, the barcode data is dynamically generated by the commercial platform 31 based on the verification information and the payment information, and the payment information is generated by the commercial platform 31 based on the payment manner.

In this embodiment, step S5 includes the commercial platform 31 receiving the transfer information and obtaining the verification information included in the transfer information. Step S6 includes the commercial platform 31 verifying whether the verification information included in the transfer information is correct, and the payment procedure is executed by the payment server 32.

In an alternative implementation, the barcode data is dynamically generated by the payment server 32 based on the verification information and the payment information, and the payment information is generated by the payment server 32 based on the payment manner. Step S5 includes the commercial platform 31 receiving the transfer information, obtaining the verification information included in the transfer information, and transmitting the verification information to the payment server 32. Step S6 includes the payment server verifying whether the verification information included in the transfer information is correct, and the payment procedure is executed by the payment server 32.

According to one exemplary embodiment, the barcode is a static barcode encoding data provided by the server device 3. In this embodiment, prior to step S1, the buyer device 1 executes the application 160 so as to transmit a request for barcode data for displaying the barcode to the server device 3.

Upon receipt of the barcode data from the server device 3, the buyer device 1 executing the application 160 encrypts the barcode data and stores the encrypted barcode data in the storage 13 of the buyer device 1.

In step S1, the buyer device 1 accesses the storage to obtain the barcode data, and generates and displays the barcode based on the barcode data.

In an alternative implementation, upon receipt of the barcode data, the buyer device 1 executing the application 160 divides the barcode data into a first part and a second part, stores the first part of the barcode data in the storage 13 of the buyer device 1, and stores the second part of the barcode data in one of the server device 3 and the cloud server 4.

In step S1, the buyer device 1 accesses the one of the server device 3 and the cloud server 4 to obtain the second part of the barcode data, combines the first part and the second part to obtain the barcode data, and generates and displays the barcode based on the barcode data.

In another alternative implementation, upon receipt of the barcode data, the buyer device 1 executing the application 160 divides the barcode data into a plurality of divided files, and stores the plurality of divided files into the storage 13 of the buyer device 1. In step S1, the buyer device 1 accesses the storage 13 thereof to obtain the divided files, combines the divided files to obtain the barcode data, and generates and displays the barcode based on the barcode data.

In yet another alternative implementation, upon receipt of the barcode data, the buyer device 1 executing the application 160 divides the barcode data into at least a first divided file and a second divided file, encrypts at least the first divided file into an encrypted file, and stores the encrypted file and the second divided file into the storage 13.

In step S1, the buyer device 1 executing the application 160 accesses the storage 13 to obtain the encrypted file and the second divided file, and displays an instruction to require the user to input a password. When a password inputted by the user is correct, the buyer device 1 decrypts the encrypted file to obtain the first divided file, combines the first and second divided files to obtain the barcode data, generates and displays the barcode based on the barcode data, and displays the barcode.

According to one exemplary embodiment, the payment information is stored in the storage 13. Step S1 includes the following sub-steps. First, the buyer device 1 executes the application 160 so as to display an instruction on the display 12 to require the user to input a password. In response to receipt of a password inputted by the user, the buyer device 1 verifies the password, and when the password is successfully verified, transmits a request for an authorization parameter to the server device 3. Upon receipt of the authorization parameter, the buyer device 1 creates a message authentication code (MAC) for the authorization parameter as the verification information using a preset key, and dynamically generates and displays the barcode based on the verification information, the payment information and the authorization parameter.

According to one exemplary embodiment, prior to step S1, the buyer device 1 generates the payment information based on a payment manner selected by the user. Step S1 includes the buyer device 1 executing the application 160 to display an instruction on the display 12 to require the user to input a password. In response to receipt of a password inputted by the user, the buyer device 1 verifies the password, and when the password is successfully verified, transmits a request for an authorization parameter to the server device 3.

Upon receipt of the authorization parameter, the buyer device 1 creates a MAC for the authorization parameter as the verification information using a preset key, and dynamically generates and displays the barcode based on the verification information, the payment information and the authorization parameter.

In an alternative implementation, upon receipt of the authorization parameter, the buyer device 1 creates a MAC for the authorization parameter and the payment amount as the verification information using a preset key, and dynamically generates and displays the barcode based on the verification information, the payment information and the authorization parameter.

According to one exemplary embodiment, the payment information is stored in the storage 13 of the buyer device 1. Step S1 includes the buyer device 1 executing the application 160 so as to display an instruction on the display 12 to require the user to input a password. In response to receipt of a password inputted by the user, the buyer device 1 verifies the password, and when the password is successfully verified, transmits a request for an authorization parameter to the server device 3.

Upon receipt of the authorization parameter from the server device 3, the buyer device 1 creates a MAC for the authorization parameter and a payment amount as the verification information using a preset key, and dynamically generates and displays the barcode based on the verification information, the payment information and the authorization parameter.

In an alternative implementation, in response to receipt of a password inputted by the user, the buyer device 1 verifies the password, and, when the password is successfully verified, dynamically generates and displays the barcode based on the verification information and the payment information.

According to one exemplary embodiment, prior to step S1, the buyer device 1 generates the payment information based on a payment manner selected by the user. Step S1 includes the buyer device 1 executing the application 160 so as to display an instruction to require the user to input a password. In response to receipt of a password inputted by the user, the buyer device 1 verifies the password, and when the password is successfully verified, dynamically generates and displays the barcode based on the verification information and the payment information.

According to one exemplary embodiment, the payment information is stored in the storage 13 of the buyer device 1. Step S1 includes the buyer device 1, by executing the application 160, displaying an instruction to require the user to input a password. In response to receipt of a password inputted by the user, the buyer device 1 verifies the password, and when the password is successfully verified, transmits the payment amount to the server device 3 and dynamically generates and displays the barcode based on the verification information and the payment information. In an alternative implementation, prior to step S1, the buyer device 1 generates the payment information based on a payment manner selected by the user. This embodiment may be employed when the hardware security module 14 is not available. Additionally, the buyer device 1 is not required to obtain the authentication parameter from the server device 3.

According to one exemplary embodiment, in step S3, after the seller device 2 scans the barcode, the content included in the barcode is not decoded by the seller device 2. Accordingly, in generating the transfer information, the seller device 2 may simply incorporate the barcode and the seller information into the transfer information without decoding the barcode.

As such, in step S6, the commercial platform 31 of the server device 3 decodes the barcode to obtain the verification information and the payment information therein, verifies the verification information, and combines the payment information and the seller information to generate a payment command when the verification information is successfully verified.

In step S7, the commercial platform 31 transmits the payment command to the payment server 32, which is programmed to execute the payment procedure based on the payment command.

In an alternative implementation, the seller device 2 decodes the barcode in step S3 to obtain the verification information and the payment information therein, combines the payment information and the seller information to generate the payment command, and incorporates the payment command and the verification information into the transfer information.

As such, in step S6, the commercial platform 31 of the server device 3 verifies the verification information. In step S7, the commercial platform 31 transmits the payment command to the payment server 32, which is programmed to execute the payment procedure based on the payment command.

In some embodiments when the smart card is present, the operations in the buyer device 1 may be performed by the processor module. Specifically, the operations (i.e., various steps in the method) in the buyer device 1 may be performed interchangeably by one of the processor 16 and the processing unit 141. Moreover, the storage of data in the buyer device may be in the storage module 17. Specifically, the data may be stored interchangeably in one of the storage 13 and the storage unit 142.

In some embodiments, the server device 3 may include a plurality of commercial platforms 31 and/or a plurality of payment servers 32, and implementation of various steps described above may be done by any one of the commercial platforms 31 and the payment servers 32, or by both.

According to one embodiment of the disclosure, there is provided an electronic device including a processor, a communication unit that is capable of communicating with a server device via a network, a display, a barcode generating module, and an input interface.

The processor is programmed to, in response to detection of a user operation indicating a request to display a barcode, control the display to display an instruction to require the user to input a password via the input interface, verify a password inputted by the user, and when the password is successfully verified, control the barcode generating module to generate a barcode that encodes verification information for verifying an identity of the user, and payment information associated with a payment account.

The processor is further programmed to control the display to display the barcode for scanning by a seller device, so as to enable the seller device and the server device to execute a payment procedure.

The barcode generating module may be one of a hardware security module and the processor executing an application. The hardware security module may be one of an external portable device removably connected to the electronic device, and a built-in module embedded in the electronic device.

According to one embodiment of the disclosure, there is provided a server device that includes a commercial platform for communicating with a buyer device and a seller device, and a payment server communicating with the commercial platform. The commercial platform is programmed to generate barcode data associated with a barcode. The barcode encodes verification information for verifying an identity of the user, and payment information associated with a payment account. Then, the commercial platform transmits the barcode data to the buyer device for displaying of the barcode based on the barcode data.

Upon receipt, from the seller device, of transfer information that includes the barcode data and seller information associated with a payee account, the commercial platform obtains the verification information from the barcode data, and verifies the verification information. Then, the commercial platform transmits the transfer information to the payment server.

In response to receipt of the transfer information, the payment server is programmed to execute a payment procedure for processing a payment for a transaction between the user and the seller according to the transfer information, to generate a payment result related to the payment, and to transmit the payment result to the buyer device and the seller device.

To sum up, embodiments of the disclosure provides a mobile payment method that enables the buyer device 1 to display a barcode that encodes the verification information and the payment information, and after scanning the barcode, the seller device 2 is enabled to generate the transfer information for the server device 3. The server device 3 is able to verify the authenticity of the transfer information, and to execute the payment procedure when it is determined that the transfer information is authentic. As a result, the payment can be verified by the server device 3 before being processed, thereby achieving enhanced security.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A mobile payment method to be implemented using a buyer device held by a user, a seller device held by a seller, and a server device that communicates with the buyer device and the seller device and that is held by a payment institution, the buyer device being installed with a hardware security module that stores the payment information therein, the mobile payment method comprising steps of:

in response to detection of a user operation indicating a request to display a barcode, displaying, by the buyer device, a barcode on a display thereof, the barcode encoding verification information for verifying an identity of the user, and payment information associated with a payment account;

scanning, by the seller device, the barcode displayed on the buyer device;

generating, by the seller device, transfer information based on the barcode and seller information associated with a payee account;

transmitting, by the seller device, the transfer information to the server device;

determining, by the server device, whether the transfer information received from the seller device is authentic;

in response to the determination that the transfer information is authentic, executing, by the server device, a payment procedure for processing a payment for a transaction between the user and the seller according to the transfer information; and after the payment procedure ends, transmitting, by the server device, a payment result related to the payment to the buyer device and the seller device;

wherein the step of displaying a barcode includes:

displaying, by the buyer device, an instruction to require the user to input a password;

in response to receipt of a password inputted by the user, requiring, by the buyer device, the hardware security module to verify the password;

transmitting, by the buyer device, a request for an authorization parameter to the server device when the password is successfully verified by the hardware security module;

in response to receipt of the authorization parameter from the server device, creating, by the hardware security module, a message authentication code (MAC) for the authorization parameter as the verification information using a preset key;

dynamically generating, by the hardware security module, barcode data based on the verification information, the payment information and the authorization parameter;

transmitting, by the hardware security module, the barcode data to the buyer device; and displaying, by the buyer device the barcode based on the barcode data;

wherein the transfer information generated by the seller device further includes the authorization parameter;

wherein the step of determining whether the transfer information received from the seller device is authentic includes, by the server device, comparing the authorization parameter included in the transfer information with the authorization parameter stored in the server device, in response to the determination that the authorization parameter included in the transfer information and the authorization parameter stored in the server device are identical, using the preset key stored in the server device to create another MAC for the authorization parameter stored in the server device, and comparing the another MAC thus generated with the verification information, and determining that the transfer information is authentic when the another MAC thus generated and the verification information are identical.

2. The mobile payment method of claim 1, wherein the payment information is generated by the buyer device based on a selected one of the payment manners selected by the user, and stored in the hardware security module prior to step of displaying the barcode.

3. The mobile payment method of claim 1, wherein the transfer information generated by the seller device further includes the payment amount;

wherein the step of determining whether the transfer information received from the seller device is authentic includes, by the server device, comparing the authorization parameter and the payment amount included in the transfer information with the authorization parameter and the payment amount stored in the server device, respectively, in response to the determination that the authorization parameter and the payment amount included in the transfer information and the authorization parameter and the payment amount stored in the server device are identical, respectively, using the preset key stored in the server device to create another MAC for the authorization parameter and the payment amount stored in the server device, comparing the another MAC thus generated with the verification information, and determining that the transfer information is authentic when the another MAC thus generated and the verification information are identical.

4. The mobile payment method of claim 1 the hardware security module being installed on and accessible by the buyer device, wherein the step of displaying a barcode further includes:

transmitting, by the buyer device, a payment amount of the payment to the server device when the password is verified by the hardware security module;

dynamically generating, by the hardware security module, barcode data based on the verification information, the payment information and the amount of the payment;

transmitting, by the hardware security module, the barcode data to the buyer device; and displaying, by the buyer device, the barcode based on the barcode data;

wherein the step of determining whether the verification information of the transfer information received from the seller device is authentic includes verifying, by the server device, whether the verification information and the payment amount are correct, wherein the step of executing a payment procedure is executed by the server device when the verification information and the payment amount are both verified to be correct.

5. The mobile payment method of claim 1, wherein:

the step of generating transfer information includes incorporating the barcode and the seller information into the transfer information without decoding the barcode;

the step of determining whether the transfer information received from the seller device is authentic includes decoding the barcode to obtain the verification information and the payment information, verifying the verification information, and combining the payment information and the seller information to generate a payment command when the verification information is successfully verified; and the step of executing the payment procedure includes the server device executing the payment procedure based on the payment command.

6. The mobile payment method of claim 1, wherein:

the step of generating the transfer information includes decoding the barcode to obtain the verification information and the payment information, combining the payment information and the seller information to generate a payment command, and incorporating the payment command and the verification information into the transfer information; and the step of executing the payment procedure includes the server device executing the payment procedure based on the payment command.

7. An electronic device comprising:

a communication unit that is capable of communicating with a server device via a network;

a display for displaying a barcode;

an input interface allowing a user to input a password;

a barcode generating module coupled to said input interface for receiving therefrom the password inputted by the user, and programmed to verify the password, and when the password is successfully verified, generate a barcode that encodes verification information for verifying an identity of the user, and payment information associated with a payment account;

a hardware security module storing the payment information therein; and a processor electrically connected to said display, operatively associated with said barcode generating module for receiving the barcode therefrom, and programmed to control said display to display the barcode for scanning by a seller device, so as to enable the seller device and the server device to execute a payment procedure for processing a payment for a transaction between the user and a seller who holds the seller device according at least to the payment information encoded in the barcode when the verification information is successfully verified by the server device, wherein said processor is further programmed to receive a payment result related to the payment from the server device through said communication unit, and to control said display to display the payment result;

wherein said processor is programmed to display the barcode by:

displaying an instruction to require the user to input a password;

in response to receipt of a password inputted by the user, requiring said hardware security module to verify the password;

transmitting a request for an authorization parameter to the server device when the password is successfully verified by the hardware security module;

in response to receipt of the authorization parameter from the server device, controlling said hardware security module to create a message authentication code (MAC) for the authorization parameter as the verification information using a preset key;

controlling said hardware security module to dynamically generate barcode data based on the verification information, the payment information and the authorization parameter; and controlling said display to display the barcode based on the barcode data.

8. The electronic device of claim 7, wherein said barcode generating module is one of a hardware security module installed on and accessible by said electronic device, and an application executed by said processor, wherein said hardware security module is one of an external portable device removably connected to said electronic device, and a built-in module embedded in said electronic device.

9. A server device comprising:

a commercial platform for communicating with a buyer device held by a user, and a seller device held by a seller; and a payment server communicating with said commercial platform;

wherein said commercial platform is programmed to generate barcode data for displaying a barcode, the barcode encoding verification information for verifying an identity of the user, and payment information associated with a payment account, transmit the barcode data to the buyer device so as to enable the buyer device to display the barcode, receive, from the seller device, transfer information that includes the barcode and seller information associated with a payee account, obtain the verification information from the barcode, verify the verification information, and transmit the transfer information to said payment server, wherein, said payment server is programmed to, in response to receipt of the transfer information, execute a payment procedure for processing a payment for a transaction between the user and the seller according to the transfer information, and transmit a payment result related to the payment to the buyer device and the seller device through said commercial platform;

wherein the generating of the barcode includes:

receiving, from the buyer device, a request for barcode data for displaying the barcode and a payment amount of the payment to the server device, the request including a payment manner selected by the user;

in response to the request, generating the payment information based on the payment manner;

dynamically generating, by said commercial platform, the barcode data based on the verification information, the payment information and the payment amount, wherein the verification information and the payment amount are pre-stored in the server device; and transmitting the barcode data to the buyer device, so as to enable the buyer device to display the barcode based on the barcode data.

10. The server device of claim 9, wherein:

the payment information is one of information stored said commercial platform and information generated based on a payment manner selected by the user.

* * * * *